United States Patent [19]

Marttila et al.

[11] 4,034,898
[45] July 12, 1977

[54] BULK BIN DELIVERY AND METERING APPARATUS

[75] Inventors: Raymond W. Marttila, Goshen; David L. McFarren, New Paris, both of Ind.

[73] Assignee: Chore-Time Equipment, Inc., Milford, Ind.

[21] Appl. No.: 642,984

[22] Filed: Dec. 22, 1975

[51] Int. Cl.² .................................... G01F 11/00
[52] U.S. Cl. .......................... 222/228; 222/242; 222/410
[58] Field of Search .......... 222/228, 236, 237, 242, 222/410, 414, 227

[56] References Cited

U.S. PATENT DOCUMENTS

| 817,727 | 4/1906 | Sletto | 222/236 |
| 3,066,831 | 12/1962 | Thompson | 222/410 X |
| 3,123,256 | 3/1964 | Smith et al. | 222/242 X |

Primary Examiner—Allen N. Knowles
Attorney, Agent, or Firm—Olson, Trexler, Wolters, Bushnell & Fosse, Ltd.

[57] ABSTRACT

Apparatus for positively encouraging a flow of feed from a bulk storage bin to a receiver or conveyor and for supporting the weight of feed in the bin is disclosed. A rotating disk mounted in the plane of the bin exhaust forms apertures with the bin sides and an exhaust collar. These apertures encourage flow of feed from the bin and uniform delivery to the receiver or conveyor. A wand, carried by the rotating plate, extends into the bin to dislodge feed packed or bridged across the bin exhaust opening.

14 Claims, 5 Drawing Figures

BULK BIN DELIVERY AND METERING APPARATUS

BACKGROUND OF THE INVENTION

This invention relates generally to delivery devices for granular substances such as poultry feed and the like, and more particularly concerns apparatus for positively creating a uniform, steady flow of material from a storage bin to a receiver.

Modern poultry or livestock feeding operations deliver precise amounts of granular feed to consuming poultry or livestock from large, remotely located storage bins or the like. It has been noted that when large quantities of feed are stored in such bins, the feed can become packed together and stick or bridge across a delivery or bin exhaust opening. When this happens little or no feed is delivered to a receiver and downstream auger conveyors and other apparatus.

To overcome this problem, devices have been offered for vibrating or striking the bin or the adjacent receiver so as to dislodge bridged feed in the bin near the exhaust opening. This striking or shaking can sometimes result in the intermittent dislodgement and delivery of large clumps of feed to the receiver. Unever flow of feed through the receiver and conveyors can strain conveyor parts.

Some of these devices, in causing uneven feed flow, place unnecessary impact loads on portions of the receiver or conveyor structure when feed clumps fall upon them. In addition, it has been found that when a relatively uniform flow of feed is delivered to a conveyor, and when that flowing feed is subjected to a light, constant pressure by only a relatively small amount of feed just above the conveyor in the boot, the conveyor will accurately deliver a metered, constant amount of feed out of the bin and conveyor. This uniform, accurately measured feed flow is desirable in operating downstream feeding system apparatus.

It is therefore an object of this invention to provide apparatus which will insure a positive flow of feed from a storage bin to a receiver which may include or can be connected to a dispensing feed conveyor. A related object is to provide apparatus which will cause this positive flow of feed even when feed is packed within the bin so as to bridge across the bin exhaust opening.

Another object is to provide an apparatus which will insure that this positive flow of feed occurs at a relatively steady state and in a uniform manner to downstream distribution apparatus, thereby minimizing fluctuations in delivery to consuming animals. An ancillary object is to provide apparatus which will deliver feed to a conveyor, but which will support most of the weight of yet-undelivered feed in the bin.

Yet another object is to provide feed delivery-insuring apparatus which provides the feed in a uniform flow upon a downstream receiver or feed delivery conveyor, thereby permitting the conveyor to deliver feed to other system parts at a uniform, accurately measured rate.

Still another object is to provide delivery apparatus which will minimize wear and tear on downstream parts. A related object is to provide such apparatus in a form which can be easily installed in existing field applications.

Other objects and advantages of the invention will become apparent upon reading the following detailed description and upon reference to the drawings.

Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
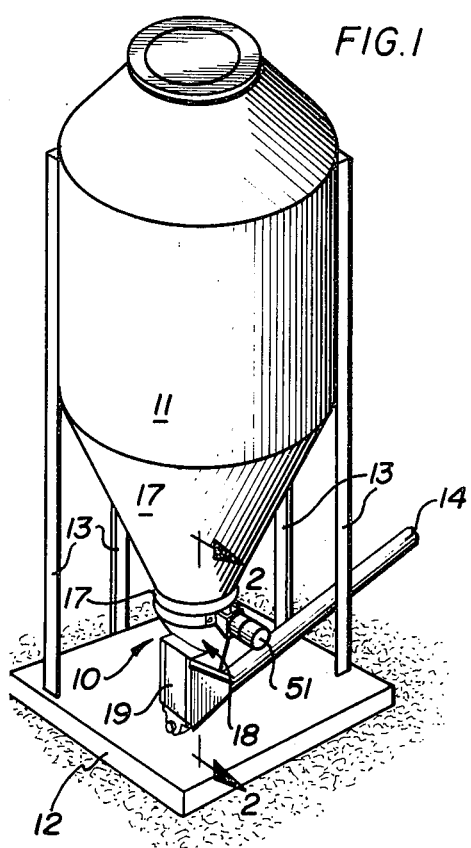
FIG. 1 is a perspective view showing a bin for containing a store of feed or like granular material and an associated delivery conveyor, the bin support legs being rearranged slightly for clarity.
Figure 2:
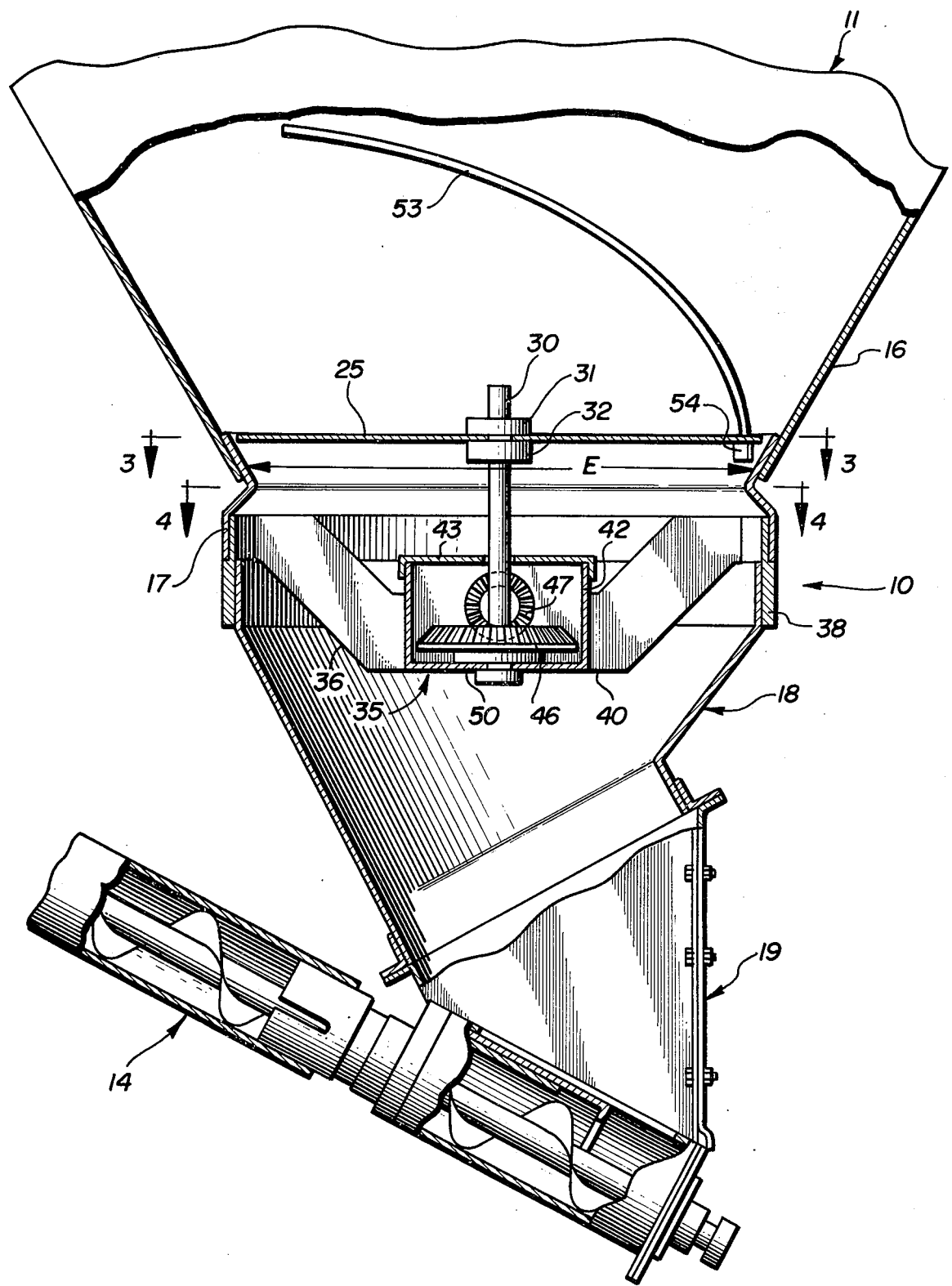
FIG. 2 is a sectional view taken substantially in the plane of line 2—2 in FIG. 1 showing in further detail the feed delivery and metering device of the present invention.

Turning first to FIG. 1, there is shown an embodiment of the novel delivery and metering apparatus 10 as it appears when installed for use with a bulk feed storage bin 11 designed to hold poultry feed or the like particulate material. The bin 11 is supported upon a foundation pad 12 by support legs 13. Feed or other material is conducted from the bin 11 and the delivery and metering device 10 by a conveyor 14 which can be of the auger variety shown in FIG. 2. The bin 11 is defined in its lower portion by a cone 16 which terminates at an annular exhaust port collar 17.

Below or downstream of this delivery and metering apparatus 10 is located delivery and conveyor apparatus. In the illustrated device, an upper boot member 18 is attached to the metering device 10, which in turn is attached to the exhaust collar 17. A lower boot portion 19 is attached to and can partly support the conveyor 14.

As can be envisioned, feed stored within the bin 11 is moved to downstream feeding apparatus (not shown) by the conveyor 14. As feed is carried away by the conveyor 14, additional feed works its way down along the side of the lower bin cone 16 and through the plane of an exhaust port E defined by the collar 17.

If a great weight of feed is stored within the bin, or if the feed is moist, or if other conditions are present, the feed can become packed within the bin and hang up or bridge across the exhaust port E. This bridging prevents proper delivery of feed to the conveyor 14. In addition, the great weight of feed pressing down upon the conveyor 14 and immediately adjacent feed can cause a nonuniform flow of feed to and through the conveyor.

In accordance with the invention, therefore, apparatus is provided for positively delivering a steady or uniform-rate flow of feed to a receiver or boot 18, 19 and conveyor 14 through the exhaust E of the bin 11 and for supporting most of the feed weight rather than applying that weight to the conveyor and other parts. This apparatus includes a device such as a plate or disk means 25 (shown in FIGS. 2 and 3) which is mounted for rotation in the plane of the bin exhaust area E. This disk means 25 can be considered to be circular in its general configuration and has an outer edge 26 which is extended to sweep substantially the entire planar area of the bin exhaust E.

To meter the flow of feed through the exhaust and to stabilize the rate of feed flow in further accordance with the invention, apertures are formed through which the feed must flow. In the illustrated embodiment, these apertures are formed by three equi-angularly spaced disk recessed edges 27. In the interests of manufacturing economy, these recessed edges 27 can be formed as straight chordal lines extending across the outer circular disk-defining edge 26. Together with the adjacent bin cone 16, three corresponding apertures 29 are formed by these recessed edges 27 through which the feed flows. It is a feature of the invention that the feed flow apertures, located adjacent the bin cone 16, causes the feed to slide over the cone 16, thereby polishing the bin wall and encouraging even easier feed flow, in contrast to other center-feed-flow-encouraging apparatus.

Figure 5:
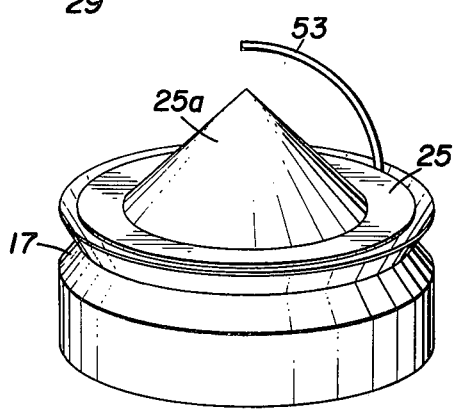
FIG. 5 is a fragmentary perspective view showing a modified form of the invention.

It will be understood that other disk shapes could also be used. For example, a hexagonal or octagonal disk could be provided. In addition, the disk 25 can be formed as a cone, or a cone 25a of appropriate shape could be mounted atop the disk 25 as shown in FIG. 5. This cone prevents stale feed from collecting and possibly spoiling in a cone of repose atop the disk.

To support this cone or disk 25 and the weight of any feed which may be borne upon it, a disk axle 30 extends perpendicularly to the disk 25 and the plane of the exhaust port E. Retentive couplings 31 and 32 secure the disk 25 to the axle 30 and permit the disk 25 to be adjustably located in any one of a number of positions throughout a range extending toward and away from the exhaust port E. In accordance with one aspect of the invention, the feed in the cavity of the boot 19 is thus isolated from the feed remaining in the bin, and uniform feed flow to and through the conveyor 14 is encouraged.

A support structure 35 is provided to journal the axle 30 and support the disk 25 and any feed borne thereon. Here, this support structure 35 includes two parallel joists 36 and 37 affixed to a support collar 38 which is, in turn secured to the exhaust collar 17 and upper boot 18. These joists 36 and 37 are formed with depressed center sections 40 and 41 which mount a gear box 42 for directly journalling and supporting the shaft 30. A cover 43 can be provided to exclude dirt and feed from the gearing and yet provide relatively easy access for servicing. Inside the box, appropriate gearing such as bevelled gears 46 and 47 connect the disk drive shaft 30 to a power shaft 48 and shaft coupling 49, and a bearing 50 provides further support for the plate 25. These shafts, gears and the disk 25 can be driven by an appropriate electric motor and gearing 51 (FIG. 1) or other power means mounted outside the bin 11 and receiving boot 16, 19. If the power source 51 drives the disk 25 at a predetermined rate of speed, the apertures 29 are moved so as to encourage a uniform rate of feed flow through the exhaust E.

Figure 3:
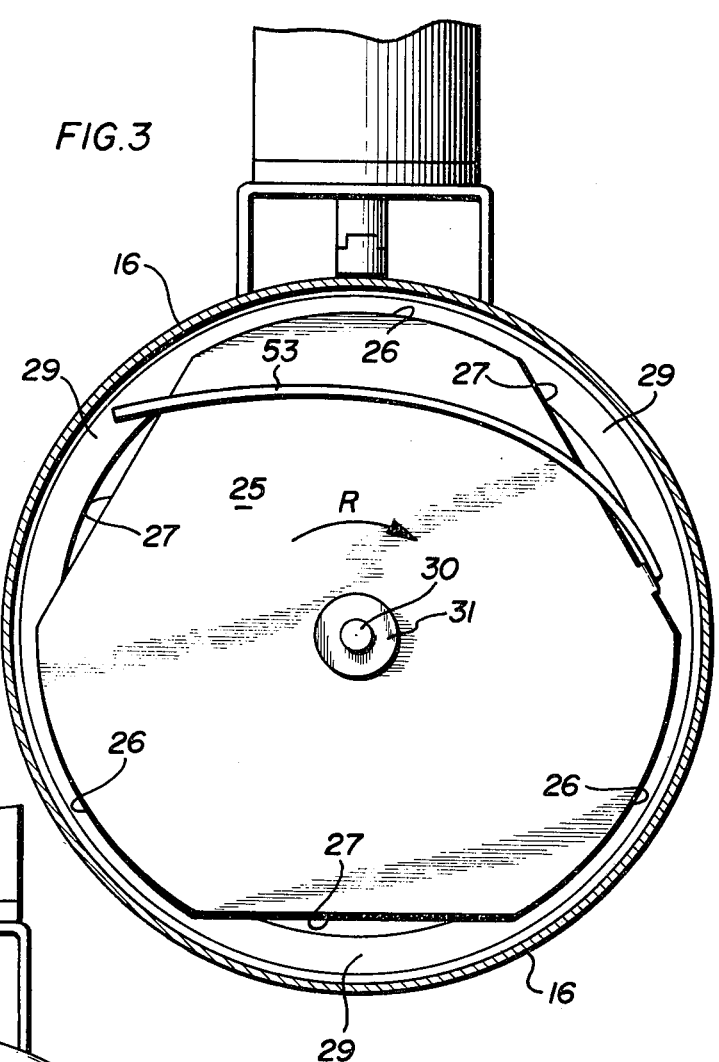
FIG. 3 is a sectional view taken substantially in the plane of line 3—3 in FIG. 2.
Figure 4:
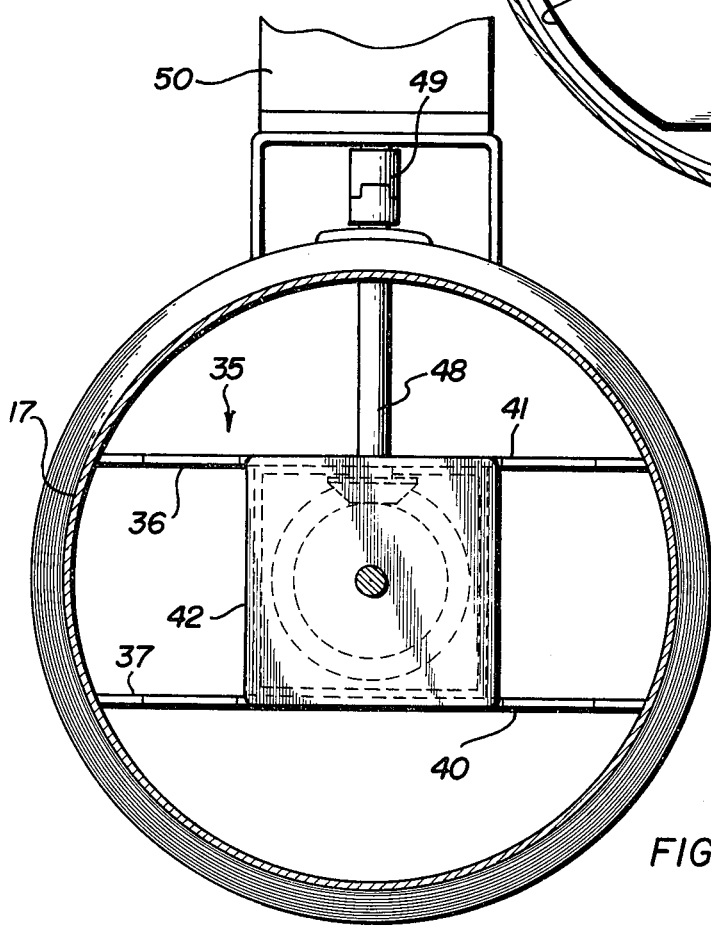
FIG. 4 is a sectional view taken substantially in the plane of line 4—4 in FIG. 2.

To dislodge feed packed above the plate 25 in further accordance with the invention, a semiflexible feed loosening wand 53 is affixed, by an appropriate fastener 54, to the disk 25. As illustrated particularly in FIGS. 2 and 3, this wand 53 extends above the disk 25 into the bottom cone 16 of the bin 11 for rotation through the feed. To encourage easy disk and wand driving motion, and to inhibit the possibility that the wand 53 might catch upon large lumps of feed or other objects, the wand 53 is designed to produce but little drag as it knifes through the feed. The semiflexible character of the wand permits it to bend and extend away from the disk 25 in a direction opposite to the direction of disk rotation R, as shown in FIG. 3. The effectiveness of this wand 53 in loosening the feed is enhanced by its length, for even though flexed, the wand 53 extends out of the normal cones of repose of that feed which falls upon and remains borne by the disk 25 and into the feed which must be loosened to fall through the apertures 29. As greater wand movement resistance is encountered, the wand 53 is simply flexed toward the disk 25, thereby presenting less wand frontal area and lessening movement resistance to an amount which can be overcome by the disk drive power source 51.

In operation, appropriate circuitry energizes the motor 50 to rotate the disk 25 and wand 53. As the wand 53 rotates through the feed, it loosens packed feed above the disk 25. The loosened feed then falls directly upon the disk 25 or upon previously deposited feed. If the falling feed is located outside the cone of repose of feed borne upon the plate, this falling feed slides along the bin cone 16, down toward and ultimately through the rotating feed flow control apertures 29. After passing the disk 25 and through the apertures 29, the feed falls through the upper boot 16, the lower boot 19, and into the auger conveyor 14 at a uniform rate for uniform distribution to downstream feed system parts. To insure that feed is removed from the space below the disk 25 and that the feed does not interfere with plate rotation, the disk-turning power source 51 can be energized by the same circuitry which energizes the motive power source of the conveyor 14.

The invention is claimed as follows:

1. Apparatus for positively delivering a steady flow of feed to a receiver from a planar bin exhaust, comprising disk means mounted for rotation in the plane of the bin exhaust area and extending to sweep, when rotated, substantially the entire exhaust area, the rotatable means defining, together with the bin side, at least three apertures moving in the exhaust area in an endless path adjacent the bin side to cause feed to flow along the bin side continuously through the exhaust and directly into the receiver.

2. Apparatus according to claim 1 wherein said disk is circular in general configuration, and includes a recessed disk edge defined by a chordal line extending across the disk-defining circle.

3. Apparatus according to claim 1 including a disk axle for rotating the disk, means and support means for journalling the axle and supporting the disk means and feed borne by the disk means.

4. Apparatus according to claim 1 including feed loosener means affixed to the rotatable disk means for loosening packed feed above the bin exhaust, and causing the loosened feed to drop upon the rotatable disk means and through the aperture in a continuous flow.

5. Apparatus according to claim 4 wherein said feed loosener means includes a wand extending above the rotatable means and into the bin for rotation through the feed in the bin.

6. Apparatus according to claim 5 wherein said wand is flexible, and is caused to extend away from the disk in a direction opposite to the direction of rotatable means and rotation by wand motion through the feed.

7. Apparatus for positively delivering a flow of feed to a receiver from a planar bin exhaust comprising disk means rotatable in the exhaust, and defining in the exhaust area, together with the bin side, at least three apertures movable in an endless circular path adjacent the bin side, and a wand affixed to the rotatable disk means for rotation therewith in the feed in the bin above the rotatable disk means and exhaust to loosen the packed feed and to cause the feed to flow along the bin side, drop upon the rotatable means and through the apertures in a continuous flow directly into the receiver.

8. Apparatus according to claim 7 wherein said wand extends out of the nominal cone of repose of feed borne upon the rotatable means.

9. Apparatus according to claim 7 including a disk axle for rotating the disk means and support means permitting the disk means and axle to rotate and supporting the disk means and any feed borne by the disk means.

10. Apparatus according to claim 9 including brace means carried by the bin and bearing means carried by the brace for directly journalling said axle.

11. Apparatus according to claim 10 including disk drive means for turning the disk means at a predetermined rate of speed.

12. Apparatus according to claim 11 wherein said disk drive means includes motive means mounted outside the bin.

13. Apparatus for positively delivering a steady flow of feed to a receiver from a planar bin exhaust, comprising cone means mounted for rotation in the plane of the bin exhaust area extending to sweep, when rotated, substantially the entire exhaust area, the rotatable means defining, together with the bin side, at least three apertures moving in the exhaust area in an endless circular path adjacent the bin side to cause feed to flow along the bin side continuously through the exhaust and directely into the receiver.

14. Apparatus for positively delivering a flow of feed to a receiver from a planar bin exhaust comprising cone means rotatable in the exhaust, and defining in the exhaust area, together with the bin side, at least three apertures movable in an endless circular path adjacent the bin side, and a wand affixed to the rotatable cone means for rotation therewith in the feed in the bin above the rotatable means and exhaust to loosen the packed feed and to cause the feed to flow along the bin side, drop upon the rotatable means, and flow through the apertures in a continuous flow directly into the receiver.

* * * * *